Figure 1:
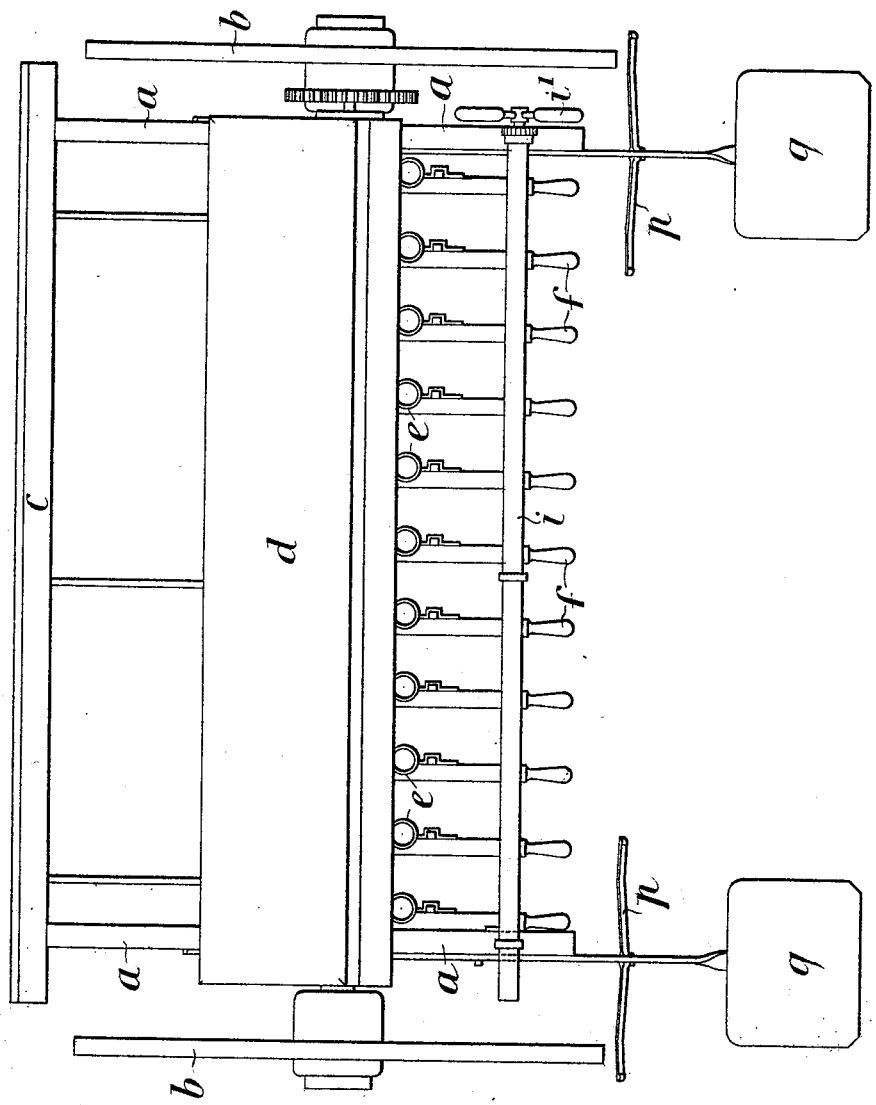

No. 634,178. Patented Oct. 3, 1899.
T. E. MARTIN.
SEED DRILL AND HORSE HOE.
Application filed July 17, 1899.
(No Model.) 2 Sheets—Sheet 1.

Witnesses
John E. Bousfield.
C. J. Redfern

Inventor.
T. E. Martin

No. 634,178. Patented Oct. 3, 1899.
T. E. MARTIN.
SEED DRILL AND HORSE HOE.
(Application filed July 17, 1899.)
(No Model.) 2 Sheets—Sheet 2.
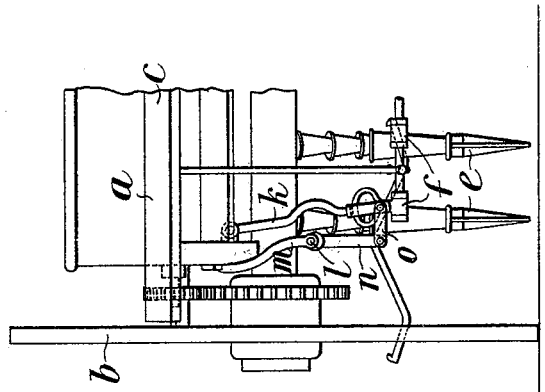
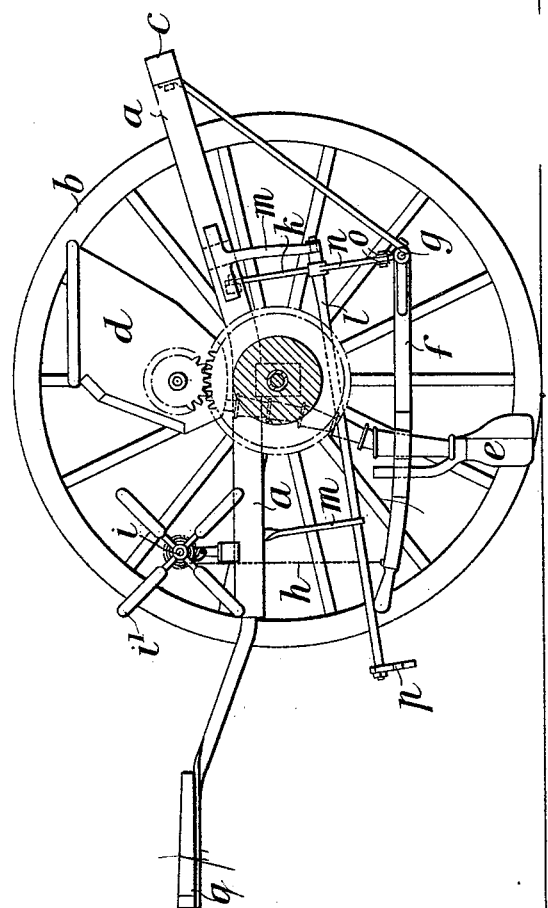
Witnesses. Inventor.

UNITED STATES PATENT OFFICE.

THOMAS EAGLE MARTIN, OF BARMER, ENGLAND.

SEED-DRILL AND HORSE-HOE.

SPECIFICATION forming part of Letters Patent No. 634,178, dated October 3, 1899.

Application filed July 17, 1899. Serial No. 724,135. (No model.)

*To all whom it may concern:*

Be it known that I, THOMAS EAGLE MARTIN, a subject of the Queen of Great Britain, residing at Barmer, near King's Lynn, England, have invented new and useful Improvements in Seed-Drills, Horse-Hoes, and Like Agricultural Implements, of which the following is a specification.

This invention relates to improvements in seed-drills, horsehoes, and like agricultural implements. In such agricultural implements as heretofore usually constructed the seed-drills, hoes, &c., have required a separate attendant for steering, which has been effected by hand. Now my invention has for its object to dispense with the necessity of employing this special attendant; and to this end I arrange for steering the drills, hoes, &c., through the medium of the feet, the steering apparatus being so constructed that it can be operated by the driver of the implement.

In carrying out my invention I advantageously provide a rocking shaft rotatably mounted in the frame of the implement and carrying at its rear end a pair of pedals, the said shaft and pedals being so placed that the driver of the implement when seated in position can support his feet upon the pedals. The rocking shaft is provided with either a crank or eccentric secured to the drill or hoe frame in such a manner that when the driver bears upon either pedal he oscillates the rocking shaft, thereby imparting the required movement to the drills or hoes.

To enable my invention to be fully understood, I will describe the same by reference to the accompanying drawings, which illustrate the application of my invention to a manure or seed drill.

Figure 1 is a plan view of such a seed-drill with my improvements upon it; Fig. 2, a sectional side elevation of the same, and Fig. 3 a partial front elevation.

$a$ is the framing of the drill, which is mounted upon traveling wheels $b$ $b$ and adapted upon the front bar $c$ for the attachment of shafts or other draft apparatus.

$d$ is the seedbox, and $e$ $e$ are the colters, into which the seed is delivered from the seedbox through the usual sectional tubes. These colters are carried by drag-bars $f$ $f$, which at their front ends are pivoted upon a bar $g$ or auxiliary frame and at their rear ends are supported by chains $h$ $h$, connected to a shaft $i$, which can be more or less rotated by a hand-wheel $i'$ and held in position to regulate the position of the drag-bars $f$ $f$, and consequently, also, the depth at which the colters $e$ $e$ work in a manner which will be readily understood. Instead of the apparatus described I may employ a lifting-lever with eccentrics to raise and lower the colters with a chain and bar.

The bar $g$, to which the colter-levers are pivoted, is adapted to be moved laterally relatively with the wheels, and for this purpose it is suspended from the frame $a$ by links $k$ $k$.

$l$ is the rocking shaft, through the medium of which the lateral movement is imparted to the bar $g$. This rocking shaft is carried in the hangers or bracket $m$ $m$, depending from the frame $a$, and is at one end provided with an arm or lever $n$, the free end of which is connected by links $o$ to the link $k$, while at its other end it carries a double-armed pedal $p$, upon which the driver of the implement when seated upon a seat $q$ can place his feet in such a position that he can by depressing one or the other arm of the said pedal rock the shaft $m$ and so transmit the desired lateral movement to the bar $g$ or auxiliary frame.

In the drawings I have represented the implement as being provided with two seats $q$ $q$ and two pedal-levers $p$ $p$, the said pedal-levers being connected with the links $k$ $k$ at the opposite ends of the bar $g$, so as to permit the steering to be effected from either side of the implement.

In order to stop sowing, I may employ an arrangement of apparatus for striking or disengaging the gear-wheel on the spindle of the seedbox from its driving-wheel from either seat.

Although I have described my invention as applied to a seed or manure drill, it will be obvious that my improvements are equally applicable to a horse-hoe or other implement wherein the hoes or the like are carried by an independent frame which is suspended from a main frame so as to be laterally movable relatively therewith.

Having now particularly described and ascertained the nature of my said invention and in what manner the same is to be performed, I declare that what I claim is—

1. In a seed or manure drill, horse-hoe or like agricultural implement, the combination with a main frame of a swinging frame supported by arms or chains depending from the said main frame and carrying the colters, hoes or the like and a pedal arranged in proximity to a driver's seat and connected by suitable means with the said swinging frame in such a manner that the movement of the said pedal serves to communicate lateral movement to the said swinging frame relatively with the main frame, substantially as, and for the purpose, described.

2. In a seed or manure drill, horse-hoe or the like, the combination of a main frame, an auxiliary frame carried by arms or chains depending from the main frame, a rock-shaft pivoted in hangers depending from the said main frame, means for connecting one end of the said rock-shaft to the swinging frame and a pedal upon the other end of the said rock-shaft, all substantially as, and for the purpose, described.

3. The combination with the main supporting-frame, of a laterally-movable frame, carrying earth-engaging devices, a rock-shaft mounted on the main frame, and extending longitudinally thereof, an arm on the rock-shaft operatively connected with said laterally-movable frame and an operating device secured to the rock-shaft for oscillating the same, substantially as described.

4. The combination with the main supporting-frame, of a laterally-movable frame, carrying earth-engaging devices, a rock-shaft mounted on the main frame, an arm on the rock-shaft operatively connected with the laterally-movable frame and pedal-levers extending laterally on opposite sides of said rock-shaft for oscillating the same, substantially as described.

THOMAS EAGLE MARTIN.

Witnesses:
 JOHN E. BOUSFIELD,
 C. G. REDFERN.